US012567374B2

(12) United States Patent
Kim et al.

(10) Patent No.: US 12,567,374 B2
(45) Date of Patent: Mar. 3, 2026

(54) GATE DRIVER AND ORGANIC LIGHT EMITTING DISPLAY DEVICE INCLUDING THE SAME

(71) Applicant: LG Display Co., Ltd., Seoul (KR)

(72) Inventors: Se-Hwan Kim, Paju-si (KR); Tae-Keun Lee, Paju-si (KR); Min-Su Kim, Daegu (KR); Hae-Jun Park, Seoul (KR); Young-Taek Hong, Gangneung-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/019,269

(22) Filed: Jan. 13, 2025

(65) Prior Publication Data

US 2025/0148990 A1 May 8, 2025

Related U.S. Application Data

(63) Continuation of application No. 18/470,890, filed on Sep. 20, 2023, now Pat. No. 12,230,213, which is a (Continued)

(30) Foreign Application Priority Data

Dec. 31, 2019 (KR) ........................ 10-2019-0179859

(51) Int. Cl.
*G09G 3/3258* (2016.01)
*G09G 3/3266* (2016.01)
(Continued)

(52) U.S. Cl.
CPC ......... *G09G 3/3258* (2013.01); *G09G 3/3266* (2013.01); *G09G 3/3291* (2013.01); (Continued)

(58) Field of Classification Search
CPC .. G09G 3/3258; G09G 3/3266; G09G 3/3291; G09G 3/3233
(Continued)

(56) References Cited

U.S. PATENT DOCUMENTS 9,111,489 B2 8/2015 Park et al.
9,305,494 B2 4/2016 Shim et al.
(Continued)

FOREIGN PATENT DOCUMENTS

CN 103903559 A 7/2014
CN 103903560 A 7/2014
(Continued)

OTHER PUBLICATIONS

Korea Intellectual Property Office, Office Action, Korean Patent Application No. 10-2025-0005311, Jul. 17, 2025, 12 pages.
(Continued)

*Primary Examiner* — Calvin C Ma
(74) *Attorney, Agent, or Firm* — Fenwick & West LLP

(57) ABSTRACT

A gate driver includes a first scan signal generator configured to output a logic voltage for driving of a scan transistor through a plurality of stages connected in cascade, the scan transistor performing a switching operation to transfer a data voltage to a driving transistor of a pixel, a second scan signal generator configured to output a logic voltage for driving of a sensing transistor through the plurality of stages, the sensing transistor sensing deterioration of a light emitting element of the pixel, a light emission control signal generator configured to output a logic voltage for control of a light emission control transistor of the pixel through the plurality of stages, and an initialization voltage generator driven by logic voltages received from some nodes of the first scan signal generator based on the light emission control signal generator to supply an initialization voltage to the pixel.

20 Claims, 7 Drawing Sheets

Related U.S. Application Data continuation of application No. 17/745,242, filed on May 16, 2022, now Pat. No. 11,798,482, which is a continuation of application No. 17/126,575, filed on Dec. 18, 2020, now Pat. No. 11,367,397.

(51) Int. Cl.
*G09G 3/3291* (2016.01)
*G09G 3/3233* (2016.01)

(52) U.S. Cl.
CPC ... *G09G 3/3233* (2013.01); *G09G 2310/0286* (2013.01); *G09G 2310/08* (2013.01); *G09G 2320/0626* (2013.01); *G09G 2360/18* (2013.01)

(58) Field of Classification Search
USPC ........................................................ 345/691.1
See application file for complete search history.

(56) References Cited

U.S. PATENT DOCUMENTS

| | | | |
|---|---|---|---|
| 9,349,317 | B2 | 5/2016 | Kim et al. |
| 9,454,935 | B2 | 9/2016 | Park et al. |
| 9,607,565 | B2 | 3/2017 | Lee |
| 9,646,535 | B2 | 5/2017 | Yoon et al. |
| 9,761,177 | B2 | 9/2017 | Mizukoshi |
| 10,127,859 | B2 | 11/2018 | Chang et al. |
| 10,366,676 | B2 | 7/2019 | Kim et al. |
| 10,551,419 | B2 | 2/2020 | Feng et al. |
| 10,559,261 | B2 | 2/2020 | Chang et al. |
| 10,706,786 | B2 | 7/2020 | Jang et al. |
| 11,798,482 | B2 | 10/2023 | Kim et al. |
| 2014/0176400 | A1 | 6/2014 | Park et al. |
| 2014/0176409 | A1 | 6/2014 | Kim et al. |
| 2015/0138180 | A1 | 5/2015 | Park et al. |
| 2015/0179105 | A1 | 6/2015 | Mizukoshi |
| 2015/0187276 | A1 | 7/2015 | Shim et al. |
| 2015/0187313 | A1 | 7/2015 | Lee |
| 2015/0364083 | A1* | 12/2015 | Jeon .................... G09G 3/3233 345/76 |
| 2016/0133185 | A1 | 5/2016 | Yoon et al. |
| 2018/0025683 | A1 | 1/2018 | Oh et al. |
| 2018/0144717 | A1 | 5/2018 | Kim et al. |
| 2018/0174553 | A1 | 6/2018 | Bong et al. |
| 2018/0190197 | A1 | 7/2018 | Chang et al. |
| 2019/0051247 | A1 | 2/2019 | Chang et al. |
| 2019/0064240 | A1 | 2/2019 | Feng et al. |
| 2019/0130842 | A1 | 5/2019 | Jang et al. |
| 2020/0027382 | A1 | 1/2020 | Wang et al. |
| 2020/0243017 | A1 | 7/2020 | Lee |
| 2021/0057458 | A1* | 2/2021 | Kim ......................... G09G 3/20 |
| 2021/0134214 | A1 | 5/2021 | Ban et al. |
| 2021/0151542 | A1 | 5/2021 | Choe et al. |
| 2021/0183312 | A1 | 6/2021 | Kim et al. |
| 2021/0193040 | A1 | 6/2021 | Na |

FOREIGN PATENT DOCUMENTS

| | | | |
|---|---|---|---|
| CN | 104658475 | A | 5/2015 |
| CN | 104732920 | A | 6/2015 |
| CN | 104751763 | A | 7/2015 |
| CN | 104751781 | A | 7/2015 |
| CN | 105590585 | A | 5/2016 |
| CN | 107367639 | A | 11/2017 |
| CN | 108091302 | A | 5/2018 |
| CN | 108257549 | A | 7/2018 |
| KR | 10-2015-0059604 | A | 6/2015 |
| KR | 10-2017-0111257 | A | 10/2017 |
| KR | 10-2018-0071642 | A | 6/2018 |
| KR | 10-2019-0049274 | A | 5/2019 |

OTHER PUBLICATIONS

China National Intellectual Property Administration, Notice of Allowance, Chinese Patent Application No. 202011526453.X, Nov. 8, 2023, 10 pages.
Korean Intellectual Property Office, Office Action, Korean Patent Application No. 10-2019-0179859, Feb. 27, 2024, 11 pages.
United States Office Action, U.S. Appl. No. 17/126,575, Sep. 24, 2021, 14 pages.
United States Office Action, U.S. Appl. No. 17/745,242, Feb. 28, 2023, 12 pages.
United States Office Action, U.S. Appl. No. 18/470,890, May 9, 2024, eight pages.

* cited by examiner

GATE DRIVER AND ORGANIC LIGHT EMITTING DISPLAY DEVICE INCLUDING THE SAME

CROSS-REFERENCE TO RELATED APPLICATION

This application is a continuation of U.S. patent application Ser. No. 18/470,890 filed on Sep. 20, 2023, which is a continuation of U.S. patent application Ser. No. 17/745,242 filed on May 16, 2022, which is a continuation of U.S. patent application Ser. No. 17/126,575 filed on Dec. 18, 2020, which claims priority from Republic of Korea Patent Application No. 10-2019-0179859, filed on Dec. 31, 2019, each of which is hereby incorporated by reference in its entirety.

BACKGROUND

Field of Technology

The present disclosure relates to a gate driver and an organic light emitting display (OLED) device including the same, and more particularly, to a gate driver in which a light emission control signal generator for generation of a light emission control signal to be supplied to a pixel and an initialization voltage generator for supply of an initialization voltage to the pixel are integrated, and an OLED device including the same.

Discussion of the Related Art

In an information dependent society, a number of techniques related to the field of a display device which displays visual information as an image or a picture have been developed. An organic light emitting display (OLED) device among display devices displays a picture using an organic light emitting diode which generates light by recombination of electrons and holes. The OLED device has been spotlighted as a next-generation display device in that it has a fast response speed and is capable of achieving low grayscale expression according to self-emission.

The OLED device includes a display panel having a display area in which pixels displaying an image are provided and a non-display area which is disposed around the display area and displays no image. Each pixel is driven by a scan signal and emits light with a brightness corresponding to the level of a data voltage.

Such an OLED device includes a display panel including data lines, gate lines, and a plurality of pixels connected to the data lines and the gate lines, a gate driver configured to supply scan signals to the gate lines, and a data driver configured to supply data voltages to the data lines. The gate driver may be formed of a gate-in-panel (GIP) circuit in a non-display area of the display panel. The gate driver includes a plurality of stages. The stages supply the scan signals, each of which swings between a gate high voltage and a gate low voltage, to the gate lines.

In an existing GIP circuit, one stage is required to generate one scan signal. Each stage comprises of a plurality of transistors. In this regard, in a high-resolution model in which the number of pixel arrays increases, the number of scan signals increases, too. As a result, the number of stages also increases, resulting in increase in area of the gate driver. The increase in area of the gate driver makes it difficult to provide a narrow bezel which reduces the thickness of the non-display area.

SUMMARY

Accordingly, the present disclosure is directed to a gate driver and an organic light emitting display (OLED) device including the same that substantially obviate one or more problems due to limitations and disadvantages of the related art.

An object of the present disclosure is to provide a gate driver which is capable of providing a narrow bezel, and an OLED device including the same.

Another object of the present disclosure is to provide a gate driver having an initialization voltage generator which is capable of supplying an initialization voltage by performing a switching operation in response to logic voltages at a Q node and a QB node of a scan signal generator based on the configuration of a light emission control signal generator, and an OLED device including the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the disclosure, as embodied and broadly described herein, a gate driver includes a first scan signal generator configured to output a logic voltage for driving of a scan transistor through a plurality of stages connected in cascade, the scan transistor performing a switching operation to transfer a data voltage to a driving transistor of a pixel, a second scan signal generator configured to output a logic voltage for driving of a sensing transistor through the plurality of stages connected in cascade, the sensing transistor sensing deterioration of a light emitting element of the pixel, a light emission control signal generator configured to output a logic voltage for control of a light emission control transistor of the pixel through the plurality of stages connected in cascade, and an initialization voltage generator driven by logic voltages received from some nodes of the first scan signal generator based on the light emission control signal generator to supply an initialization voltage to the pixel.

The initialization voltage generator may include switching transistors configured to receive logic voltages at a Q node and a QB node of the light emission control signal generator, respectively, and operate in response to the received logic voltages, respectively, and switching transistors configured to receive logic voltages at a Q node and a QB node of the first scan signal generator, respectively, and operate in response to the received logic voltages, respectively.

The initialization voltage generator may output a logic voltage for control of the supply of the initialization voltage based on the logic voltages at the Q node and QB node of the first scan signal generator.

The initialization voltage generator may receive a start pulse and a clock simultaneously with the light emission control signal generator.

The initialization voltage generator may include a first switching transistor turned on by a logic voltage at a QB node of the light emission control signal generator applied to a gate electrode thereof to output a high-level initialization voltage, transferred to a source electrode thereof, through a drain electrode thereof, a second switching transistor turned on by a logic voltage at a QB node of the first scan signal generator applied to a gate electrode thereof to receive the output voltage from the first switching transistor through a source electrode thereof and output the high-level initialization voltage through a drain electrode thereof, a third switching transistor turned on by a logic voltage at a Q node of the light emission control signal generator applied to a gate electrode thereof to output a low-level initialization voltage, transferred to a source electrode thereof, through a drain electrode thereof, and a fourth switching transistor turned on by a logic voltage at a Q node of the first scan signal generator applied to a gate electrode thereof to receive the low-level initialization voltage through a source electrode thereof and output the low-level initialization voltage through a drain electrode thereof.

The initialization voltage generator may further include a fifth switching transistor turned on by a low-level voltage for driving of the light emission control signal generator applied to a gate electrode thereof to transfer the logic voltage at the Q node of the light emission control signal generator to the gate electrode of the third switching transistor, and a sixth switching transistor turned on by a low-level voltage for driving of the first scan signal generator applied to a gate electrode thereof to transfer the logic voltage at the Q node of the first scan signal generator to the gate electrode of the fourth switching transistor.

It is to be understood that both the foregoing general description and the following detailed description of the present disclosure are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Figure 1:
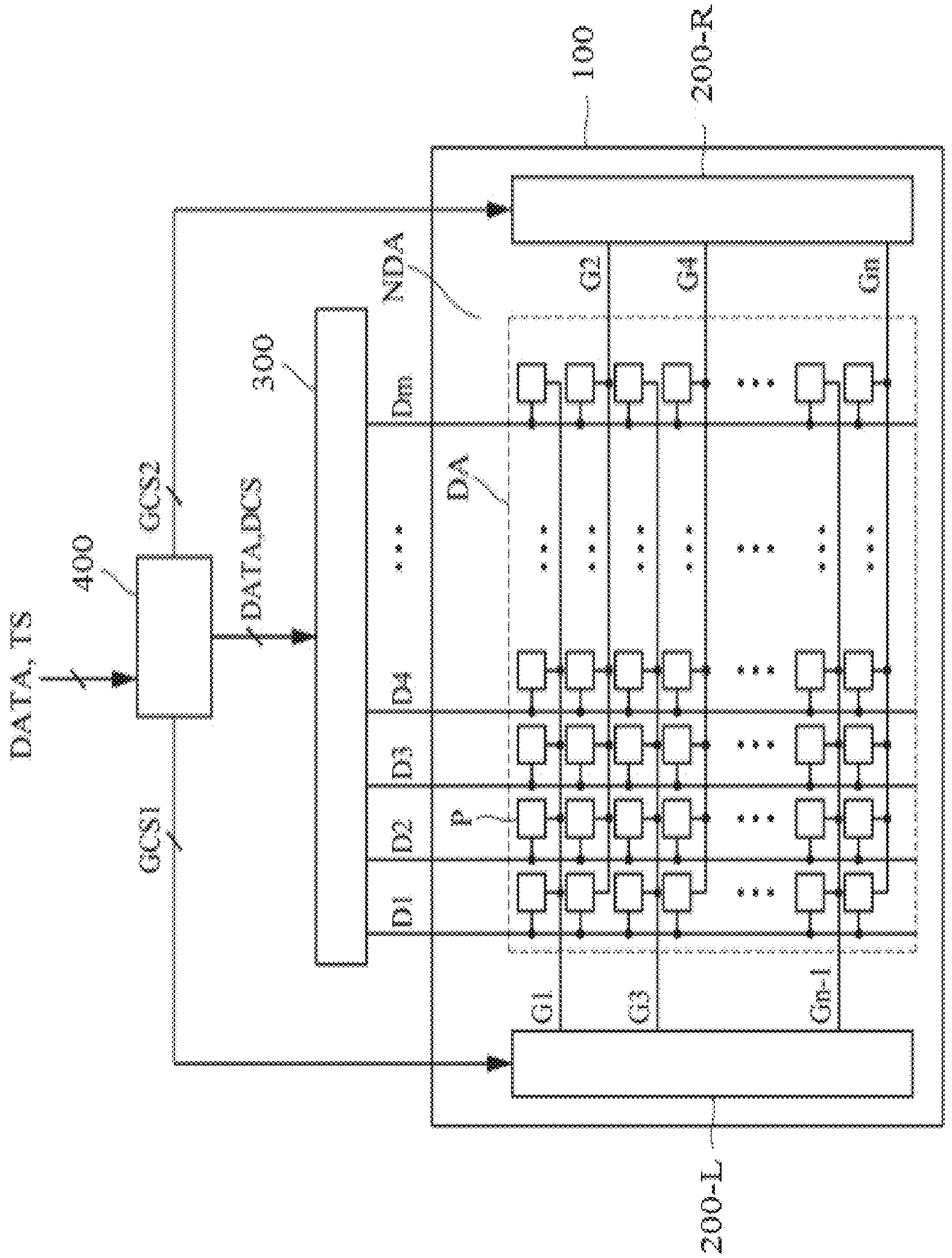
FIG. 1 is a block diagram showing the configuration of an organic light emitting display (OLED) device according to one embodiment of the present disclosure.

For embodiments of the present invention disclosed in the description, specific structural and functional descriptions are exemplified for the purpose of describing embodiments of the present invention, and embodiments of the present invention can be implemented in various forms and are not to be considered as a limitation of the invention.

The present invention can be modified in various manners and have various forms and specific embodiments will be described in detail with reference to the drawings. However, the disclosure should not be construed as limited to the embodiments set forth herein, but on the contrary, the disclosure is to cover all modifications, equivalents, and alternatives falling within the spirit and scope of the present invention.

While terms, such as "first", "second", etc., may be used to describe various components, such components must not be limited by the above terms. The above terms are used only to distinguish one component from another. For example, a first component may be referred to as a second component and the second component may be referred to as the first component without departing from the scope of the present invention.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements. Other representations for describing a relationship between elements, that is, "between", "immediately between", "in proximity to", "in direct proximity to" and the like should be interpreted in the same manner.

The terms used in this specification are merely used in order to describe particular embodiments, and are not intended to limit the scope of the present invention. An element described in the singular form is intended to include a plurality of elements unless the context clearly indicates otherwise. In this specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Unless otherwise defined, all terms including technical and scientific terms used herein have the same meaning as commonly understood by one of ordinary skill in the art to which the present invention pertains. It will be further understood that terms, such as those defined in commonly used dictionaries, should be interpreted as having a meaning that is consistent with their meaning in the context of the related art and should not be interpreted in an idealized or overly formal sense unless expressly so defined herein.

Meanwhile, when a certain embodiment can be implemented in a different manner, a function or an operation specified in a specific block may be performed in a different sequence from that specified in a flowchart. For example, two consecutive blocks may be simultaneously executed or reversely executed according to a related function or operation.

In the following description, a pixel circuit and a gate driving circuit formed on a substrate of a display panel may be implemented with n-type or p-type transistors. For example, a transistor may be implemented with a transistor of a metal oxide semiconductor field effect transistor (MOSFET) structure. The transistor is a three-electrode element including a gate, a source and a drain. The source is an electrode that supplies carriers to the transistor. In the transistor, carriers start to flow from the source. The drain is an electrode through which carriers externally flow in the transistor. For example, carriers flow from the source to the drain in the transistor. In the case of the n-type transistor, carriers are electrons and thus a source voltage is lower than a drain voltage such that the electrons flow from the source to the drain. Since electrons flow from the source to the drain in the n-type transistor, current flows from the drain to the source. In the case of the p-type transistor, carriers are holes and thus a source voltage is higher than a drain voltage such that the holes flow from the source to the drain. Since holes flow from the source to the drain in the p-type transistor, current flows from the source to the drain. The source and the drain of a transistor are not fixed and may be interchanged according to voltages applied thereto.

In the following description, in the p-type transistor, a turn-on voltage may be a low-level voltage and a turn-off voltage may be a high-level voltage. In the n-type transistor, the turn-on voltage may be the high-level voltage and the turn-off voltage may be the low-level voltage.

Hereinafter, a gate driver and an organic light emitting display (OLED) device including the same according to the present invention will be described with reference to the annexed drawings.

Figure 2:
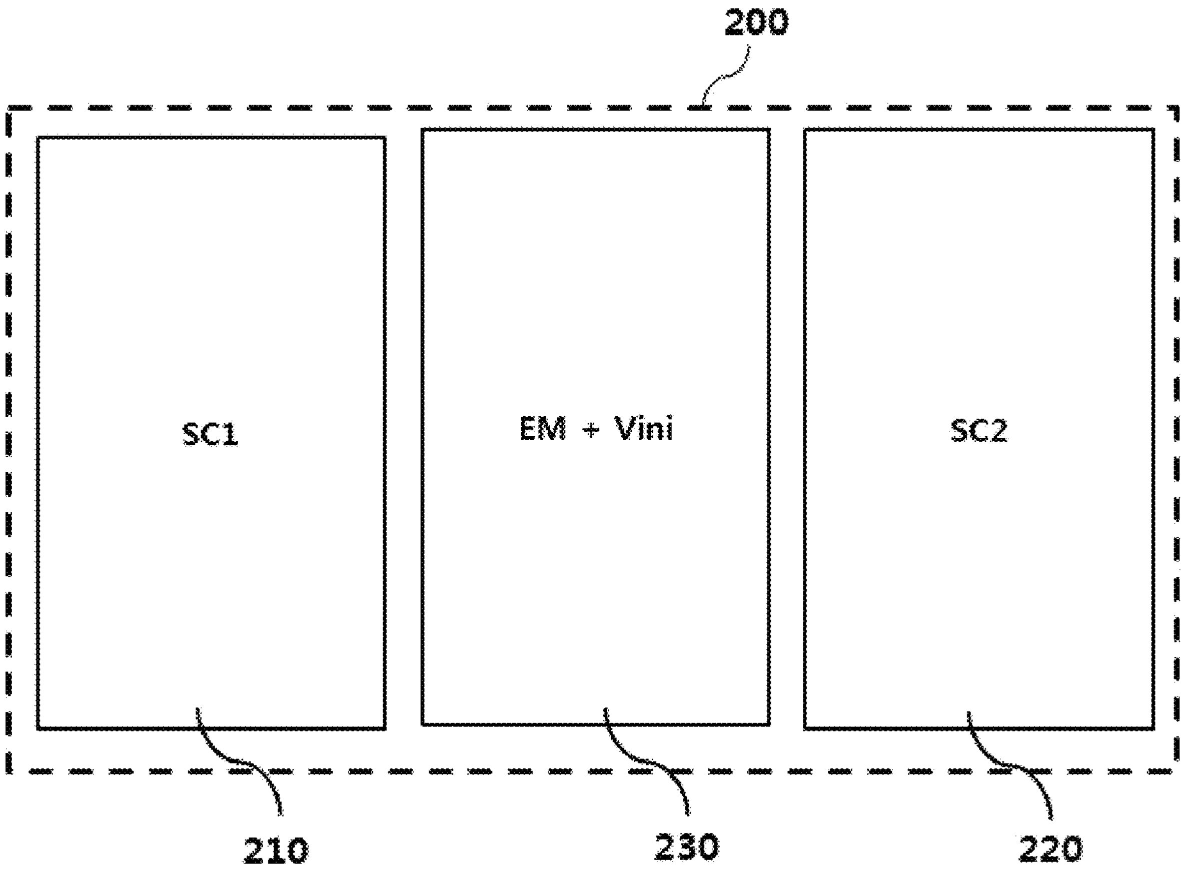
FIG. 2 is a block diagram of a gate driver according to one embodiment of the present disclosure.

FIG. 1 is a block diagram showing the configuration of an OLED device according to the present disclosure. FIG. 2 is a block diagram of a gate driver according to one embodiment of the present disclosure. Referring to FIG. 1, the OLED device according to the present disclosure includes a display panel 100, a data driver 300, a first gate driver 200-L, a second gate driver 200-R, and a timing controller 400.

The OLED device according to the present disclosure supplies data voltages to pixels P in a line sequential scanning manner which sequentially supplies scan signals to gate lines G1 to Gn.

The display panel 100 includes data lines D1 to Dm (where m is a positive integer greater than or equal to 2), the gate lines G1 to Gn (where n is a positive integer greater than or equal to 2), the pixels P connected to the data lines D1 to Dm and the gate lines G1 to Gn, and the first and second gate drivers 200-L and 200-R.

Each pixel P may be connected to any one of the data lines D1 to Dm and any one of the gate lines G1 to Gn. As a result, each pixel P is supplied with a data voltage of a corresponding data line when a scan signal is supplied to a corresponding gate line, and emits light with a certain brightness based on the supplied data voltage.

The first gate driver 200-L is connected to odd-numbered ones G1, G3, . . . , Gn−1 of the gate lines G1 to Gn to supply odd-numbered scan signals thereto. The second gate driver 200-R is connected to even-numbered ones G2, G4, . . . , Gn of the gate lines G1 to Gn to supply even-numbered scan signals thereto.

In detail, the first gate driver 200-L receives a first gate control signal GCS1 from the timing controller 400. The first gate driver 200-L generates the odd-numbered scan signals in response to the first gate control signal GCS1 and supplies the same to the odd-numbered gate lines G1, G3, . . . , Gn-1. The second gate driver 200-R receives a second gate control signal GCS2 from the timing controller 400. The second gate driver 200-R generates the even-numbered scan signals in response to the second gate control signal GCS2 and supplies the same to the even-numbered gate lines G2, G4, . . . , Gn. That is, the first and second gate drivers 200-L and 200-R may be driven in an interlaced manner, but are not limited thereto.

The first gate driver 200-L may supply scan signals to some gate lines of the display panel 100, and the second gate driver 200-R may supply scan signals to the other gate lines of the display panel 100.

Alternatively, the first gate driver 200-L may supply scan signals to all gate lines of the display panel 100, and the second gate driver 200-R may also supply scan signals to all gate lines of the display panel 100. In this case, a scan signal of the same waveform is supplied to the same gate line.

The display panel 100 may be divided into a display area DA and a non-display area NDA. The display area DA is an area in which the pixels P are provided to display an image. The non-display area NDA is an area which is disposed around the display area DA and does not display an image. The first and second gate drivers 200-L and 200-R may be provided in the non-display area NDA in a gate-in-panel (GIP) manner. In FIG. 1, the first gate driver 200-L is shown as being provided at the left part of the non-display area NDA of the display panel 100 and the second gate driver 200-R is shown as being provided at the right part of the non-display area NDA of the display panel 100. However, the present disclosure is not limited thereto. For example, the first and second gate drivers 200-L and 200-R may be disposed at different sides of the non-display area NDA of the display panel 100 in the non-display area NDA as needed, or disposed at the same side of the non-display area NDA unless they overlap each other without getting out of the non-display area NDA.

The data driver 300 is connected to the data lines D1 to Dm. The data driver 300 receives digital video data DATA and a data control signal DCS from the timing controller 400 and converts the digital video data DATA into analog data voltages in response to the data control signal DCS. The data driver 300 supplies the analog data voltages to the data lines D1 to Dm. The data driver 300 may include one source drive integrated circuit (IC) or a plurality of source drive ICs.

The timing controller 400 receives the digital video data DATA and timing signals TS from an external system board. The timing signals TS may include a vertical synchronous signal, a horizontal synchronous signal, a data enable signal, and a dot clock. The timing controller 400 generates the first and second gate control signals GCS1 and GCS2 for control of the operation timings of the first and second gate drivers 200-L and 200-R and the data control signal DCS for control of the operation timing of the data driver 300 based on the timing signals TS.

Each of the first and second gate control signals GCS1 and GCS2 may include a start pulse, a clock, and a reset signal.

The timing controller 400 supplies the digital video data DATA and the data control signal DCS to the data driver 300. The timing controller 400 supplies the first gate control signal GCS1 to the first gate driver 200-L and supplies the second gate control signal GCS2 to the second gate driver 200-R.

FIG. 2 is a block diagram of a gate driver according to one embodiment of the present disclosure. As shown in FIG. 2, the gate driver 200 includes a first scan signal generator 210, a second scan signal generator 220, and an integrated circuit 230 in which a light emission control signal generator and an initialization voltage generator are integrated.

Figure 3:
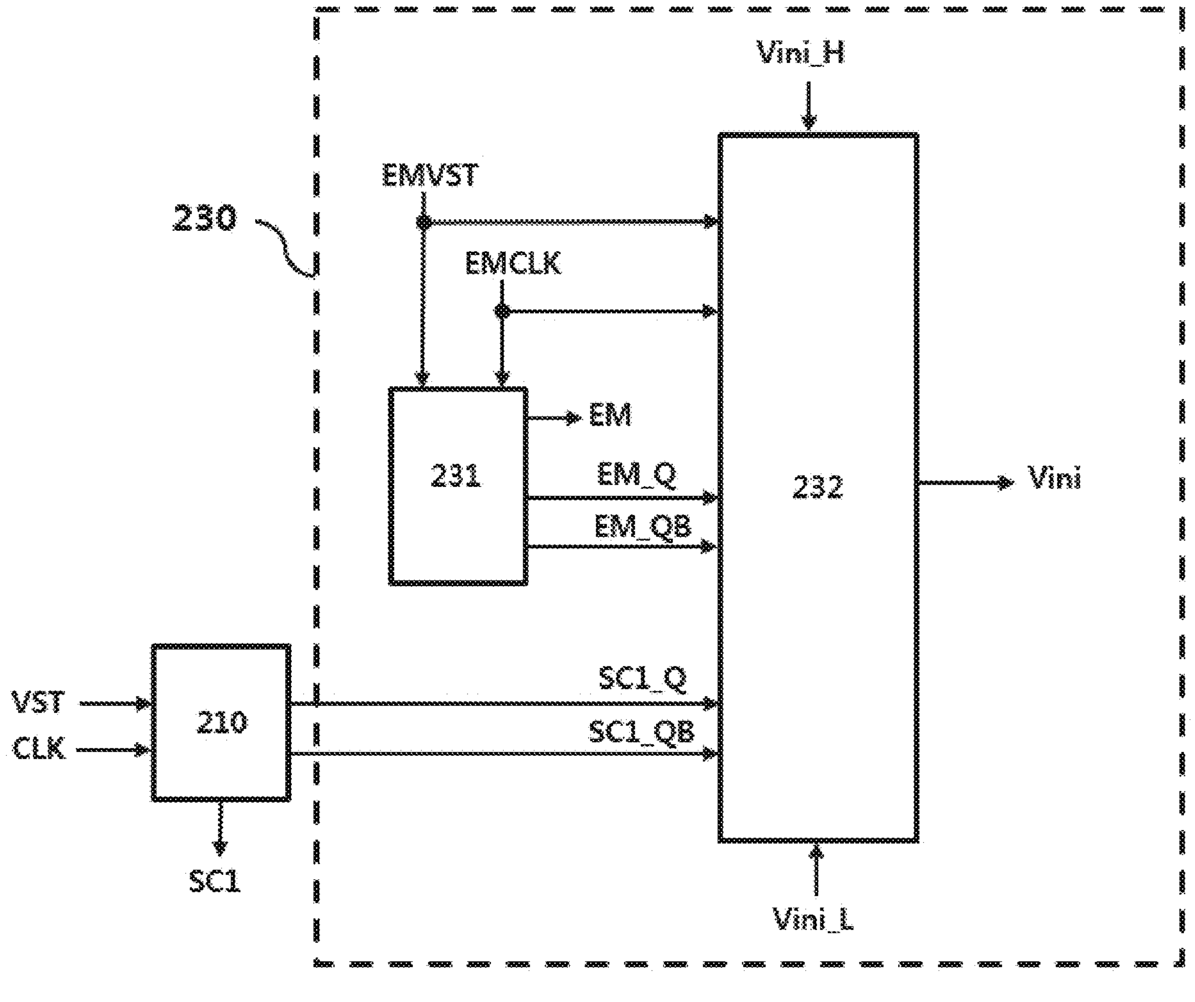
FIG. 3 is a detailed block diagram of an integrated circuit of the gate driver of FIG. 2 according to one embodiment of the present disclosure.

FIG. 3 is a detailed block diagram of the integrated circuit 230 of the gate driver 200 of FIG. 2. As shown in FIG. 3, the integrated circuit 230 includes a light emission control signal generator 231 and an initialization voltage generator 232. The first scan signal generator 210 is driven by a start pulse VST and a first scan signal clock CLK input thereto to output a first scan signal SC1. The light emission control signal generator 231 is driven by a start pulse EMVST and a light emission control signal clock EMCLK input thereto to output a light emission control signal EM.

The initialization voltage generator 232 receives logic voltages at a Q node EM_Q and a QB node EM_QB of the light emission control signal generator 231 and logic voltages at a Q node SC1_Q and a QB node SC1_QB of the first scan signal generator 210. At this time, the initialization voltage generator 232 receives the start pulse EMVST and the clock EMCLK applied to the light emission control signal generator 231 simultaneously with the light emission control signal generator 231 and is driven by the start pulse EMVST and the clock EMCLK to output an initialization voltage *Vini* to be supplied to a pixel.

Figure 4:
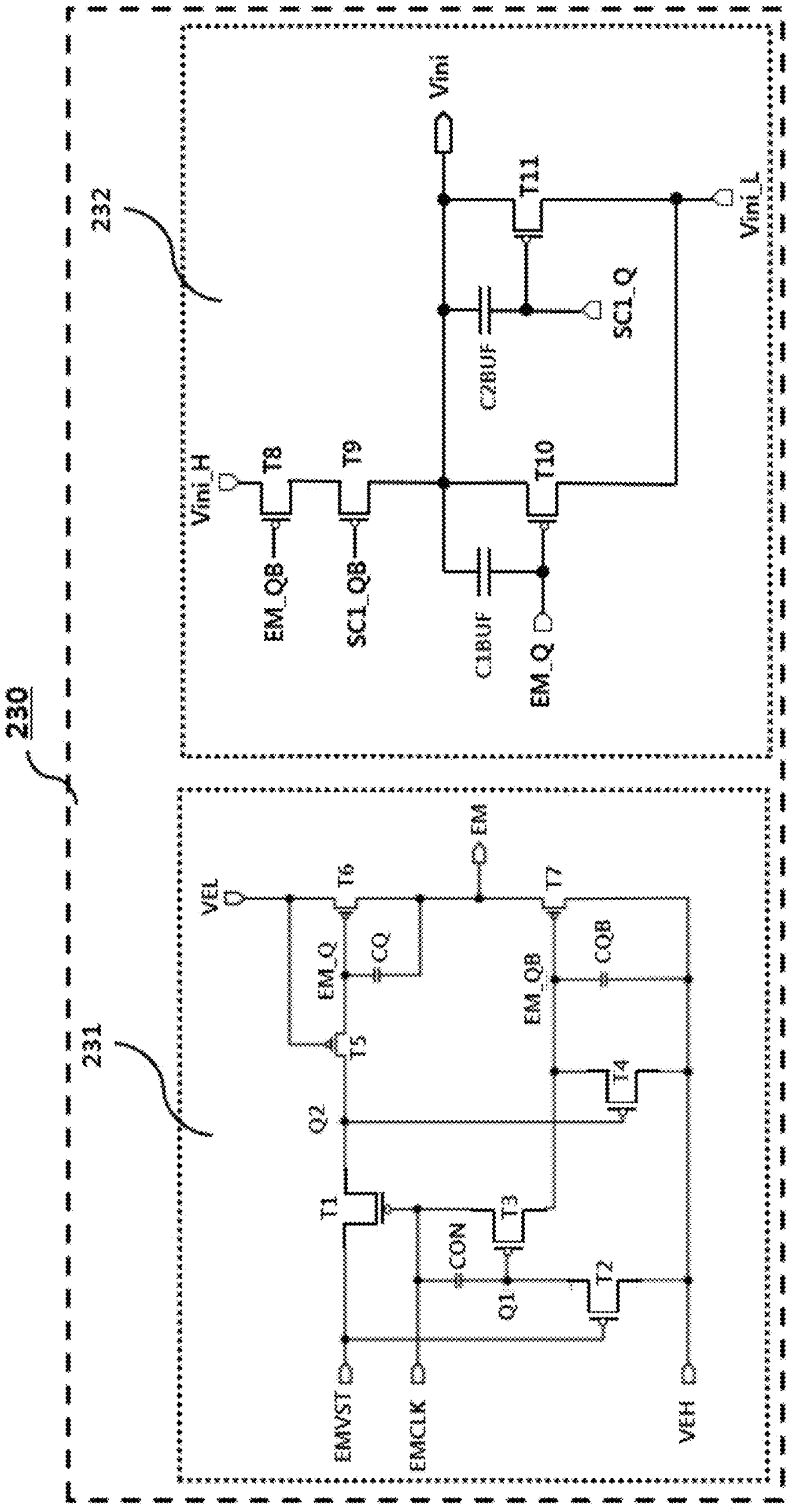
FIG. 4 is a detailed circuit diagram of the integrated circuit of the gate driver of FIG. 2 according to one embodiment of the present disclosure.

The integrated circuit 230 according to the present disclosure includes the light emission control signal generator 231 and the initialization voltage generator 232, as shown in FIG. 4.

The light emission control signal generator 231 includes first to seventh transistors T1 to T7 and first to third capacitors CON, CQ and CQB as shown in FIG. 4. The sixth transistor T6 and the seventh transistor T7 may be included in an output unit which outputs the light emission control signal EM. Any one of the first to seventh transistors T1 to T7 may a double-gate transistor.

In the present embodiment, all transistors of the light emission control signal generator 231 may be exemplarily implemented with P-type thin film transistors which are turned on under the condition that a low-level voltage is applied thereto and are turned off under the condition that a high-level voltage is applied thereto, but the present invention is not limited thereto.

The first transistor T1 has a gate electrode connected to a clock line, a source electrode connected to a start pulse line, and a drain electrode connected to a node Q2. The first transistor T1 is turned on or off according to the voltage level of the clock EMCLK applied to the clock line.

The second transistor T2 has a gate electrode connected to the start pulse line, a source electrode connected to a high-level voltage line, and a drain electrode connected to a node Q1. The second transistor T2 is turned on or off according to the voltage level of the start pulse EMVST supplied to the gate electrode thereof to transfer or block a high-level voltage VEH to the node Q1.

The third transistor T3 has a gate electrode connected to the node Q1, a source electrode connected to the clock line, and a drain electrode connected to the node EM_QB. The third transistor T3 is turned on or off according to the voltage level of the node Q1 to transfer or block the voltage of the clock EMCLK, input through the clock line, to the node EM_QB.

The fourth transistor T4 has a gate electrode connected to the node Q2, a source electrode connected to the high-level voltage line, and a drain electrode connected to the node EM_QB. The fourth transistor T4 is turned on or off according to the voltage level of the node Q2 to transfer or block the high-level voltage VEH, supplied through the source electrode thereof, to the node EM_QB.

The fifth transistor T5 has a gate electrode connected to a low-level voltage line, a source electrode connected to the node Q2, and a drain electrode connected to the node EM_Q. The fifth transistor T5 is always turned on by a low-level voltage VEL supplied to the gate electrode thereof to transfer a logic voltage at the node Q2 to the node EM_Q.

The sixth transistor T6 has a gate electrode connected to the node EM_Q, a source electrode connected to the low-level voltage line, and a drain electrode connected to a light emission control signal output node. The sixth transistor T6 is turned on or off according to the level of the voltage at the node EM_Q supplied to the gate electrode thereof to output or block the low-level voltage VEL, supplied through the source electrode thereof, to the light emission control signal output node.

The seventh transistor T7 has a gate electrode connected to the node EM_QB, a source electrode connected to the high-level voltage line, and a drain electrode connected to the light emission control signal output node. The seventh transistor T7 is turned on or off according to the level of the voltage at the node EM_QB supplied to the gate electrode thereof to output or block the high-level voltage VEH, supplied through the source electrode thereof, to the light emission control signal output node.

The first capacitor CON has one terminal connected to the node Q1 and the other terminal connected to the clock line. The second capacitor CQ has one terminal connected to the node EM_Q and the other terminal connected to the light emission control signal output node. The third capacitor CQB has one terminal connected to the node EM_QB and the other terminal connected to the high-level voltage line.

The initialization voltage generator 232 includes eighth to eleventh transistors T8 to T11 and first and second buffering capacitors C1BUF and C2BUF.

The eighth transistor T8 has a gate electrode connected to the node EM_QB of the light emission control signal generator 231, a source electrode connected to a high-level initialization voltage line, and a drain electrode connected to a source electrode of the ninth transistor T9. The eighth transistor T8 is turned on or off according to the level of the voltage at the node EM_QB of the light emission control signal generator 231 supplied to the gate electrode thereof to transfer or block a high-level initialization voltage *Vini*_H, supplied through the source electrode thereof, to the drain electrode thereof.

The ninth transistor T9 has a gate electrode connected to the node SC1_QB of the first scan signal generator 210, a source electrode connected to the drain electrode of the eighth transistor T8, and a drain electrode connected to an initialization voltage output node. The ninth transistor T9 is turned on or off according to the level of the voltage at the node SC1_QB of the first scan signal generator 210 supplied to the gate electrode thereof to transfer or block the high-level initialization voltage Vini_H, supplied through the source electrode thereof, to the initialization voltage output node.

The tenth transistor T10 has a gate electrode connected to the node EM_Q of the light emission control signal generator 231, a source electrode connected to a low-level initialization voltage line, and a drain electrode connected to the initialization voltage output node. The tenth transistor T10 is turned on or off according to the voltage level of the node EM_Q of the light emission control signal generator 231 to transfer or block a low-level initialization voltage Vini_L, supplied through the source electrode thereof, to the initialization voltage output node.

The eleventh transistor T11 has a gate electrode connected to the node SC1_Q of the first scan signal generator 210, a source electrode connected to the low-level initialization voltage line, and a drain electrode connected to the initialization voltage output node. The eleventh transistor T11 is turned on or off according to the voltage level of the node SC1_Q of the first scan signal generator 210 to transfer or block the low-level initialization voltage Vini_L, supplied through the source electrode thereof, to the initialization voltage output node.

The first buffering capacitor C1BUF has one terminal connected to the node EM_Q of the light emission control signal generator 231 and the other terminal connected to the initialization voltage output node. The second buffering capacitor C2BUF has one terminal connected to the node SC1_Q of the first scan signal generator 210 and the other terminal connected to the initialization voltage output node.

The gate electrodes of the ninth transistor T9 and eleventh transistor T11 of the initialization voltage generator 232 receive the logic voltages at the node SC1_QB and node SC1_Q of the first scan signal generator 210, respectively.

Figure 5:
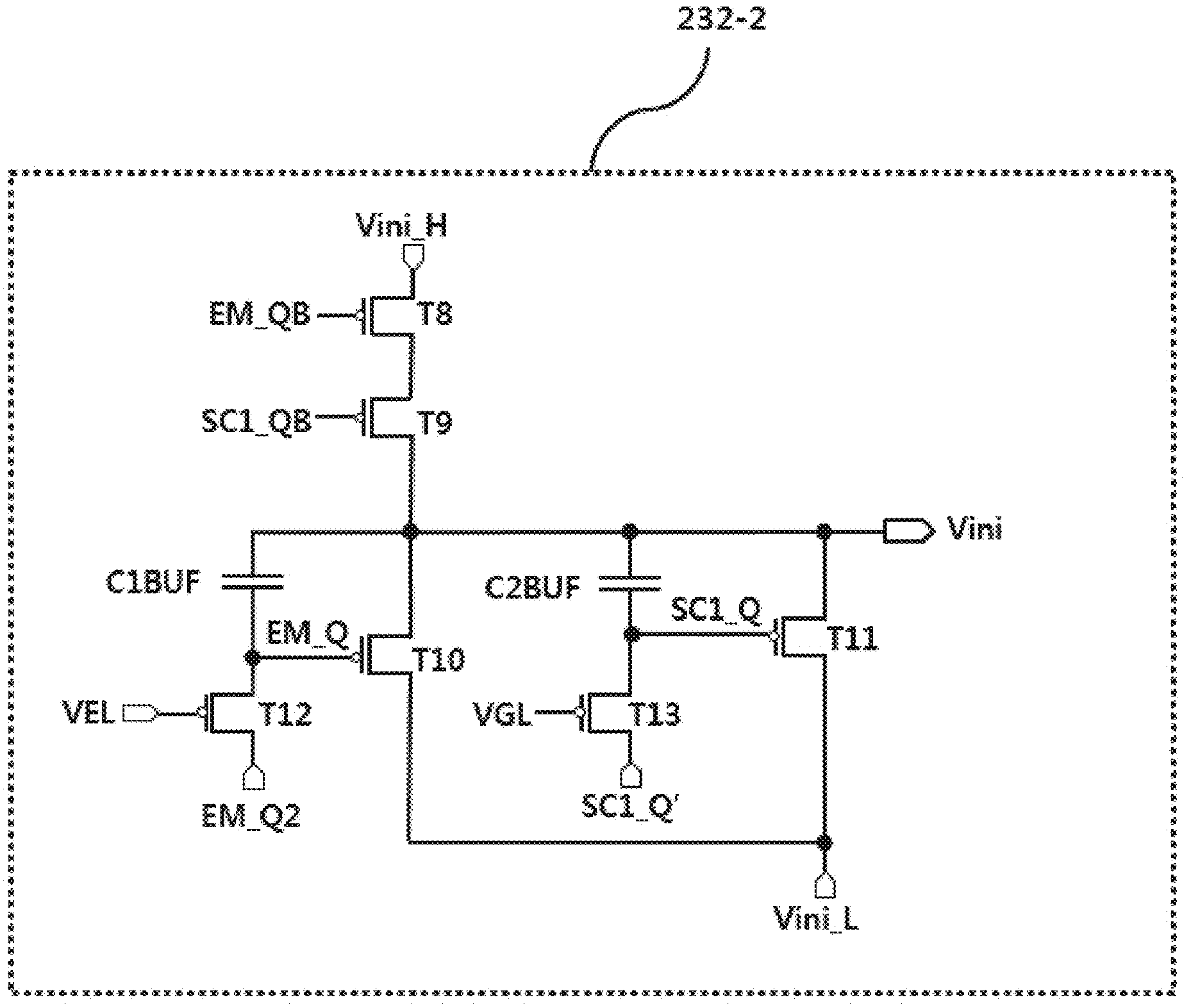
FIG. 5 is a circuit diagram of an initialization voltage generator according to another embodiment of the present disclosure.

On the other hand, an initialization voltage generator 232-2 according to another embodiment of the present disclosure may be configured as shown in FIG. 5. Eighth to eleventh transistors T8 to T11 and first and second buffering capacitors C1BUF and C2BUF are the same in configuration as those in FIG. 4. Further, the initialization voltage generator 232-2 may include a twelfth transistor T12 and a thirteenth transistor T13.

The twelfth transistor T12 has a gate electrode connected to the low-level voltage line of the light emission control signal generator 231, a source electrode connected to a node EM_Q2 of the light emission control signal generator 231, and a drain electrode connected to the node EM_Q of the light emission control signal generator 231 and the gate electrode of the tenth transistor T10. The twelfth transistor T12 is always turned on by the low-level voltage VEL of the light emission control signal generator 231 to transfer a logic voltage based on the voltage level of the node EM_Q2 of the light emission control signal generator 231 to the gate electrode of the tenth transistor T10.

The thirteenth transistor T13 has a gate electrode connected to a low-level voltage line of the first scan signal generator 210, a source electrode connected to a node SC1_Q' of the first scan signal generator 210, and a drain electrode connected to the node SC1_Q of the first scan signal generator 210 and the gate electrode of the eleventh transistor T11. The thirteenth transistor T13 is always turned on by a low-level voltage VGL of the first scan signal generator 210 to transfer a logic voltage based on the voltage level of the node SC1_Q' of the first scan signal generator 210 to the gate electrode of the eleventh transistor T11.

This addition of the twelfth and thirteenth transistors T12 and T13 which are always turned on may make it possible to distinguish between the voltage level of the node EM_Q2 of the light emission control signal generator 231 and the voltage level of the node SC1_Q' of the first scan signal generator 210, and the voltage level of the node EM_Q of the light emission control signal generator 231 and the voltage level of the node SC1_Q of the first scan signal generator 210. As a result, drain-source voltages of the first transistor T1 and third transistor T3 of the light emission control signal generator 231 may increase, thereby making it possible to reduce degradation in reliability of the device.

Figure 6:
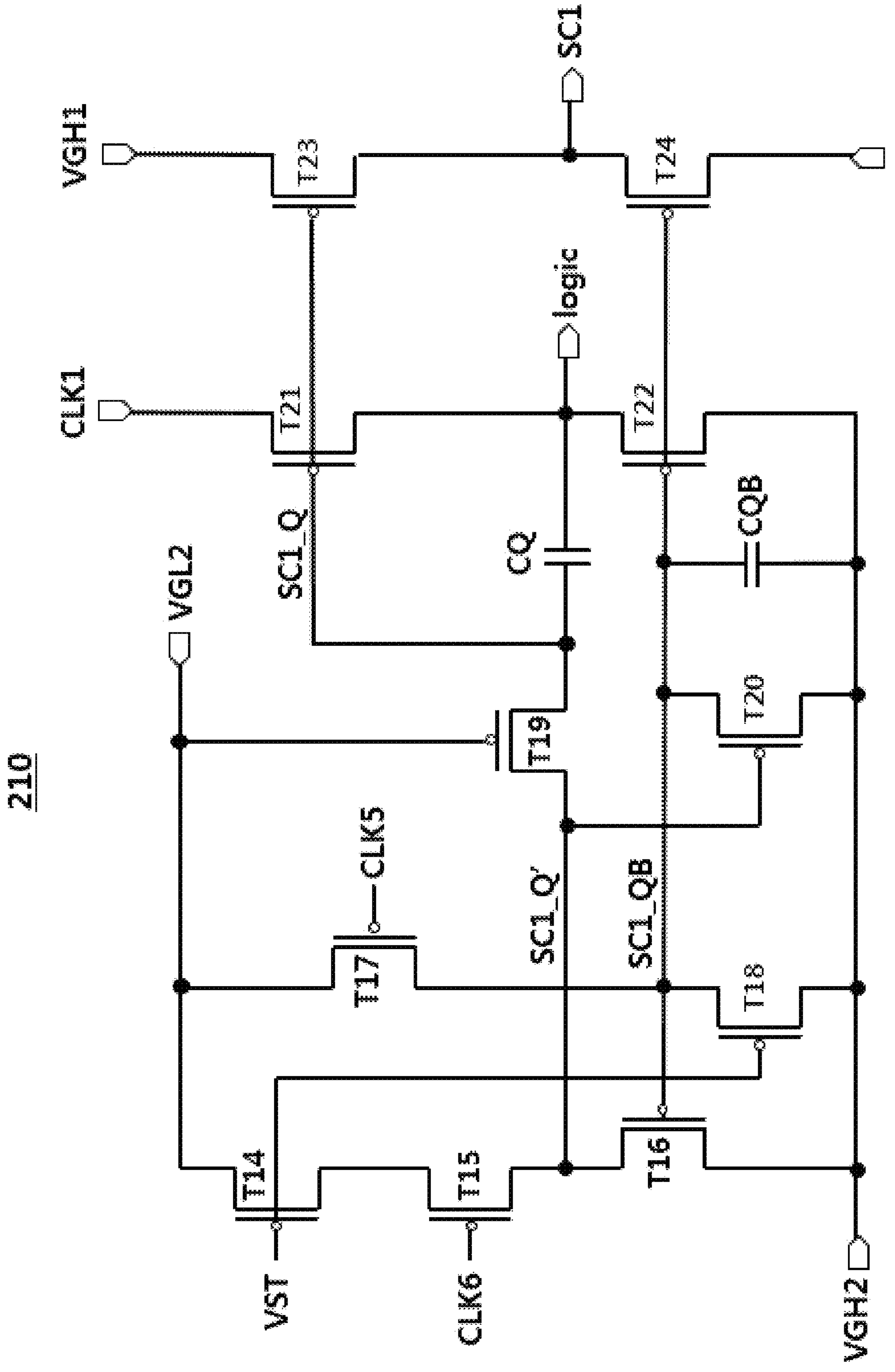
FIG. 6 is a circuit diagram of a first scan signal generator of the gate driver of FIG. 2 according to one embodiment of the present disclosure.

The first scan signal generator 210 may be configured as shown in FIG. 6.

The first scan signal generator 210 includes fourteenth to twenty-fourth transistors T14 to T24 and first and second bootstrap capacitors CQ and CQB. The twenty-first transistor T21 and the twenty-second transistor T22 may be included in an output unit outputting a logic voltage which is a carry pulse to be transferred to a next stage. The twenty-third transistor T23 and the twenty-fourth transistor T24 may be included in an output unit which outputs the first scan signal SC1.

The fourteenth transistor T14 has a gate electrode connected to a start pulse line, a source electrode connected to a second low-level voltage line, and a drain electrode connected to a source electrode of the fifteenth transistor T15. The fourteenth transistor T14 is turned on or off according to the voltage level of the start pulse VST supplied to the gate electrode thereof to transfer or block a second low-level voltage VGL2 to the drain electrode thereof.

The fifteenth transistor T15 has a gate electrode connected to a sixth clock line, a source electrode connected to the drain electrode of the fourteenth transistor T14, and a drain electrode connected to the node SC1_Q'. The fifteenth transistor T15 is turned on or off according to the voltage level of a sixth clock CLK6 supplied to the gate electrode thereof to transfer or block the second low-level voltage VGL2, transferred to the source electrode thereof through the fourteenth transistor T14, to the node SC1_Q'.

The sixteenth transistor T16 has a gate electrode connected to the node SC1_QB, a source electrode connected to a second high-level voltage line, and a drain electrode connected to the node SC1_Q'. The sixteenth transistor T16 is turned on or off according to the level of the voltage at the node SC1_QB supplied to the gate electrode thereof to transfer or block a second high-level voltage VGH2, transferred through the source electrode thereof, to the node SC1_Q'.

The seventeenth transistor T17 has a gate electrode connected to a fifth clock line, a source electrode connected to the second low-level voltage line, and a drain electrode connected to the node SC1_QB. The seventeenth transistor T17 is turned on or off according to the voltage level of a fifth clock CLK5 supplied to the gate electrode thereof to transfer or block the second low-level voltage VGL2, transferred through the source electrode thereof, to the node SC1_QB connected to the drain electrode thereof.

The eighteenth transistor T18 has a gate electrode connected to the start pulse line, a source electrode connected to the second high-level voltage line, and a drain electrode connected to the node SC1_QB. The eighteenth transistor T18 is turned on or off according to the voltage level of the start pulse VST supplied to the gate electrode thereof to transfer or block the second high-level voltage VGH2, transferred through the source electrode thereof, to the node SC1_QB connected to the drain electrode thereof.

The nineteenth transistor T19 has a gate electrode connected to the second low-level voltage line, a source electrode connected to the node SC1_Q', and a drain electrode connected to the node SC1_Q. The nineteenth transistor T19 is always turned on by the second low-level voltage VGL2 supplied to the gate electrode thereof to transfer the voltage at the node SC1_Q' to the node SC1_Q.

The twentieth transistor T20 has a gate electrode connected to the node SC1_Q', a source electrode connected to the second high-level voltage line, and a drain electrode connected to the node SC1_QB. The twentieth transistor T20 is turned on or off according to the level of the voltage at the node SC1_Q' supplied to the gate electrode thereof to transfer or block the second high-level voltage VGH2, transferred through the source electrode thereof, to the node SC1_QB connected to the drain electrode thereof.

The twenty-first transistor T21 has a gate electrode connected to the node SC1_Q, a source electrode connected to a first clock line, and a drain electrode connected to a logic output node. The twenty-first transistor T21 is turned on or off according to the level of the voltage at the node SC1_Q supplied to the gate electrode thereof to output or block a logic voltage of a first clock CLK1, supplied through the source electrode thereof, to the logic output node.

The twenty-second transistor T22 has a gate electrode connected to the node SC1_QB, a source electrode connected to the second high-level voltage line, and a drain electrode connected to the logic output node. The twenty-second transistor T22 is turned on or off according to the level of the voltage at the node SC1_QB supplied to the gate electrode thereof to output or block the second high-level voltage VGH2, supplied through the source electrode thereof, to the logic output node.

The first bootstrap capacitor CQ has one terminal connected to the node SC1_Q and the other terminal connected to the logic output node. The first bootstrap capacitor CQ is charged with current supplied through the nineteenth transistor T19 to bootstrap the voltage at the node SC1_Q.

The second bootstrap capacitor CQB has one terminal connected to the node SC1_QB and the other terminal connected to the second high-level voltage line. The second bootstrap capacitor CQB receives the second high-level voltage VGH2 to bootstrap the voltage at the node SC1_QB.

The twenty-third transistor T23 has a gate electrode connected to the node SC1_Q, a source electrode connected to a first high-level voltage line, and a drain electrode connected to a first scan signal output node. The twenty-third transistor T23 is turned on or off according to the level of the voltage at the node SC1_Q supplied to the gate electrode thereof to output or block a first high-level voltage VGH1, supplied through the source electrode thereof, as the first scan signal SC1.

The twenty-fourth transistor T24 has a gate electrode connected to the node SC1_QB, a source electrode connected to a first low-level voltage line, and a drain electrode connected to the first scan signal output node. The twenty-fourth transistor T24 is turned on or off according to the level of the voltage at the node SC1_QB supplied to the gate electrode thereof to output or block a first low-level voltage VGL1, supplied through the source electrode thereof, as the first scan signal SC1.

Figure 7:
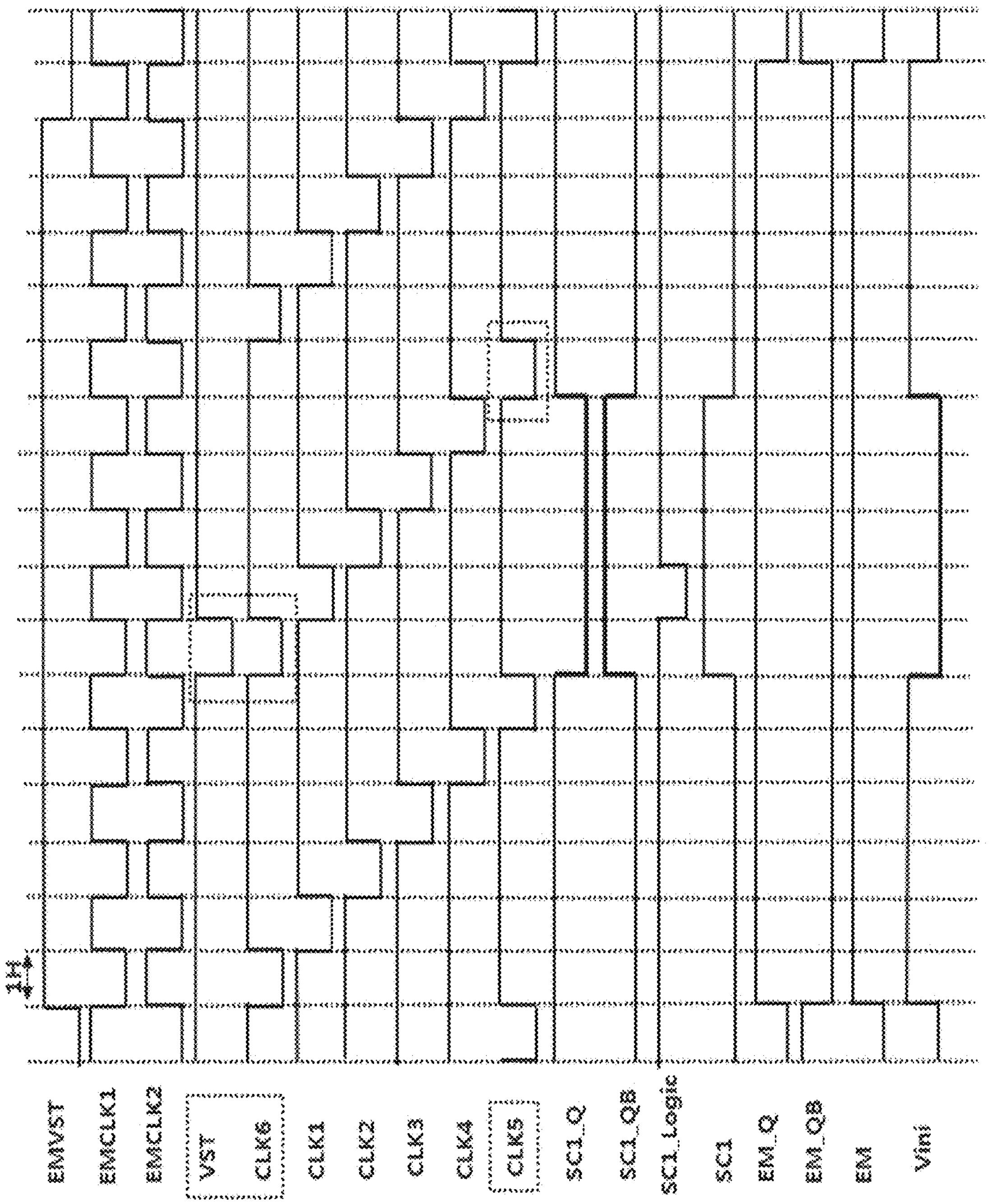
FIG. 7 is a waveform diagram illustrating the operation of an initialization voltage generator according to the one embodiment of the present disclosure.

FIG. 7 is a waveform diagram illustrating the operation of the initialization voltage generator 232 according to the one embodiment of the present disclosure.

As shown in FIG. 7, the light emission start pulse EMVST is kept high in level until the second, sixth clock signal CLK6 is supplied through the sixth clock line of the first scan signal generator 210.

A first light emission control signal clock EMCLK1 applied through a first light emission control signal clock line may alternately have a low-level voltage and a high-level voltage at a cycle of one horizontal period 1H.

A second light emission control signal clock EMCLK2 applied through a second light emission control signal clock line may alternately have the high-level voltage and the low-level voltage at the cycle of the one horizontal period 1H. The first light emission control signal clock EMCLK1 and the second light emission control signal clock EMCLK2 may have the high-level voltage and the low-level voltage in opposite phases to each other.

The elements in the light emission control signal generator 231 operate according to the light emission start pulse EMVST, the first light emission control signal clock EMCLK1, the second light emission control signal clock EMCLK2, the high-level voltage VEH, and the low-level voltage VEL.

The first transistor T1 of the light emission control signal generator 231 is always turned on by the first light emission control signal clock EMCLK1 and the second light emission control signal clock EMCLK2 supplied in opposite phases to each other. The high-level voltage is applied to the Q node EM_Q of the light emission control signal generator 231 by the light emission start pulse EMVST of the high-level voltage supplied through the source electrode of the first transistor T1. At this time, the low-level voltage is applied to the QB node EM_QB of the light emission control signal generator 231 to turn on the seventh transistor T7, thereby causing the light emission control signal EM of the high-level voltage VEH to be output to the light emission control signal output node.

The eighth transistor T8 of the initialization voltage generator 232 is turned on by the low-level voltage at the QB node EM_QB of the light emission control signal generator 231 supplied to the gate electrode thereof. The high-level initialization voltage Vini_H supplied through the source electrode of the eighth transistor T8 is transferred to the source electrode of the ninth transistor T9 via the drain electrode of the eighth transistor T8.

The ninth transistor T9 is turned on by the low-level voltage at the QB node SC1_QB of the first scan signal generator 210 supplied to the gate electrode thereof. The high-level initialization voltage Vini_H supplied through the source electrode of the ninth transistor T9 is output through the initialization voltage output node.

At this time, the tenth transistor T10 is turned off by the high-level voltage at the Q node EM_Q of the light emission control signal generator 231. At this time, the eleventh transistor T11 is turned off by the high-level voltage at the Q node SC1_Q of the first scan signal generator 210.

On the other hand, when the voltage at the QB node SC1_QB of the first scan signal generator 210 is changed from the low-level voltage to the high-level voltage, the ninth transistor T9 is turned off. At this time, as the voltage at the Q node SC1_Q of the first scan signal generator 210 is changed from the high-level voltage to the low-level voltage, the eleventh transistor T11 of the initialization voltage generator 232 is turned on. As the eleventh transistor T11 is turned on, the low-level initialization voltage Vini_L supplied through the low-level initialization voltage line connected to the source electrode of the eleventh transistor T11 is output to the initialization voltage output node.

When the fifth clock CLK5 of the low-level voltage is supplied to the gate electrode of the seventeenth transistor T17 of the first scan signal generator 210, the seventeenth transistor T17 is turned on. The second low-level voltage VGL2 supplied to the source electrode of the seventeenth transistor T17 is transferred to the QB node SC1_QB of the first scan signal generator 210. The low-level voltage at the QB node SC1_QB is supplied to the gate electrode of the twenty-fourth transistor T24 of the first scan signal generator 210 to turn on the twenty-fourth transistor T24. As a result, the first low-level voltage VGL1 supplied to the source electrode of the twenty-fourth transistor T24 is output as the output signal SC1 of the first scan signal generator 210.

At this time, the high-level voltage at the Q node SC1_Q of the first scan signal generator 210 is supplied to the gate electrode of the eleventh transistor T11 of the initialization voltage generator 232 to turn off the eleventh transistor T11.

The low-level voltage at the QB node EM_QB of the light emission control signal generator 231 is supplied to the gate electrode of the eighth transistor T8 of the initialization voltage generator 232 to turn on the eighth transistor T8. The low-level voltage at the QB node SC1_QB of the first scan signal generator 210 is supplied to the gate electrode of the ninth transistor T9 of the initialization voltage generator 232 to turn on the ninth transistor T9. As a result, the high-level initialization voltage Vini_H supplied to the source electrode of the eighth transistor T8 of the initialization voltage generator 232 is output to the initialization voltage output node via the drain electrode of the ninth transistor T9 of the initialization voltage generator 232.

When the sixth clock CLK6 of the low-level voltage is supplied to the gate electrode of the fifteenth transistor T15 of the first scan signal generator 210 at the same time that the start pulse VST of the low-level voltage is supplied to the gate electrode of the fourteenth transistor T14 of the first scan signal generator 210, the initialization voltage *Vini* which is output through the initialization voltage generator 232 is changed from the high-level voltage to the low-level voltage. When the fifth clock CLK5 of the low-level voltage is supplied to the gate electrode of the seventeenth transistor T17 of the first scan signal generator 210, the initialization voltage *Vini* which is output through the initialization voltage generator 232 is changed from the low-level voltage to the high-level voltage.

As described above, in the gate driver and the OLED device including the same according to the present disclosure, the light emission control signal generator and the initialization voltage generator are integrated such that the initialization voltage generator is driven by logic voltages received from some nodes of the first scan signal generator based on the light emission control signal generator to supply the initialization voltage to a pixel. Therefore, it may be possible to reduce the size of a bezel.

As is apparent from the above description, in a gate driver and an OLED device including the same according to the present invention, a light emission control signal generator and an initialization voltage generator are integrated so that the size of a bezel may be reduced.

Although the embodiments of the present disclosure have been disclosed for illustrative purposes, those skilled in the art will appreciate that various modifications, additions and substitutions are possible, without departing from the scope and spirit of the invention as disclosed in the accompanying claims.

What is claimed is:

1. A display device comprising:
- a plurality of pixels receiving data voltages of data lines when scan signals are supplied to gate lines, the plurality of pixels emitting light in response to the supplied data voltages;
- a display panel including a display area in which the plurality of pixels and a non-display area surrounding the display area;
- a gate driver including a first scan signal generator configured to output a first scan signal and a light emission control signal generator configured to output a light emission control signal;
- wherein the first scan signal generator is located closer to the display area than the light emission control signal generator.

2. The display device of claim 1, wherein the gate driver further comprises:
- a second gate signal generator configured to output a second gate signal;
- wherein the light emission control signal generator is closer to the display area than the second gate signal generator.

3. The display device of claim 2, wherein the gate driver including a first gate driver circuit and a second gate driver circuit,
- wherein the first gate driver circuit is on one side of a display area and the second gate driver circuit is on another side of the display area.

4. The display device of claim 3, further comprises:
- a data driver configured to supply the data voltages to the data lines of the plurality of pixels.

5. The display device of claim 4, further comprises:
- a timing controller configured to configured to supply control signals to respective the first gate driver circuit and the second gate driver circuit.

6. The display device of claim 5, wherein the first gate driver circuit and the second gate driver circuit respectively receive a control signal that includes a start pulse, a clock, and a reset signal output from the timing controller.

7. The display device of claim 3, wherein the first gate driver circuit and the second gate driver circuit are configured to supply a same scan signal to a same gate line from the gate lines.

8. The display device of claim 3, wherein the light emission control signal generator comprises:
- a first transistor having a gate electrode connected to a clock line, a source electrode connected to a start pulse line, and a drain electrode connected to a second node;
- a second transistor having a gate electrode connected to a start pulse line, a source electrode connected to a high-level voltage line, and a drain electrode connected to a first node;
- a third transistor having a gate electrode connected to the first node, a source electrode connected to the clock line, and a drain electrode connected to a QB node of the light emission control signal generator;
- a fourth transistor having a gate electrode connected to the second node, a source electrode connected to the high-level voltage line, and a drain electrode connected to the QB node of the light emission control signal generator;
- a fifth transistor having a gate electrode connected to a low-level voltage line, a source electrode connected to the second node, and a drain electrode connected to a Q node of the light emission control signal generator;
- a sixth transistor having a gate electrode connected to the Q node, a source electrode connected to the low-level voltage line, and a drain electrode connected to a light emission control signal output node; and
- a seventh transistor having a gate electrode connected to the QB node, a source electrode connected to the high-level voltage line, and a drain electrode connected to the light emission control signal output node.

9. The display device of claim 8, wherein the light emission control signal generator further comprises:
- a first capacitor having one terminal connected to the first node and another terminal connected to the clock line;
- a second capacitor having one terminal connected to the Q node and another terminal connected to the light emission control signal output node; and
- a third capacitor having one terminal connected to the QB node and another terminal connected to the high-level voltage line.

10. The display device of claim 9, wherein the first gate driver circuit is connected to odd gate lines from the gate lines and the second gate driver circuit is connected to even gate lines from the gate lines.

11. The display device of claim 10, wherein the first gate driver circuit and the second gate driver circuit are driven in an interlaced manner.

12. The display device of claim 3, wherein each of the first gate driver circuit and second gate driver circuit comprise an initialization voltage generator configured to supply initialization voltages to the plurality of pixels.

13. The display device of claim 12, wherein the initialization voltage generator driven by voltages received from some nodes of the first scan signal generator based on the light emission control signal generator to supply an initialization voltage to a pixel from the plurality of pixels.

14. The display device of claim 13, wherein the initialization voltage generator comprises:

a first group of switching transistors configured to receive voltages at a Q node and a QB node of the light emission control signal generator, respectively, and operate in response to the voltages at the Q node and the QB node of the light emission control signal generator, respectively; and a second group of switching transistors configured to receive voltages at a Q node and a QB node of the first scan signal generator, respectively, and operate in response to the voltages at the Q node and the QB node of the first scan signal generator, respectively.

15. The display device of claim 14, wherein the initialization voltage generator outputs a voltage that controls the supply of the initialization voltage based on logic voltages at the Q node and QB node of the first scan signal generator.

16. The display device of claim 14, wherein the initialization voltage generator receives a start pulse and a clock simultaneously with the light emission control signal generator.

17. The display device of claim 14, wherein the initialization voltage generator comprises:

a first switching transistor turned on by the voltage at the QB node of the light emission control signal generator applied to a gate electrode thereof to output a high-level initialization voltage, transferred to a source electrode thereof, through a drain electrode thereof;

a second switching transistor turned on by the voltage at the QB node of the first scan signal generator applied to a gate electrode thereof to receive the output voltage from the first switching transistor through a source electrode thereof and output the high-level initialization voltage through a drain electrode thereof;

a third switching transistor turned on by the voltage at the Q node of the light emission control signal generator applied to a gate electrode thereof to output a low-level initialization voltage, transferred to a source electrode thereof, through a drain electrode thereof;

a fourth switching transistor turned on by a logic voltage at a Q node of the first scan signal generator applied to a gate electrode thereof to receive the low-level initialization voltage through a source electrode thereof and output the low-level initialization voltage through a drain electrode thereof;

a fifth switching transistor turned on by a low-level voltage for driving of the second gate driver circuit applied to a gate electrode thereof to transfer the logic voltage at the Q node of the second gate driver circuit to the gate electrode of the third switching transistor; and a sixth switching transistor turned on by a low-level voltage for driving of the first gate driver circuit applied to a gate electrode thereof to transfer the logic voltage at the Q node of the first gate driver circuit to the gate electrode of the fourth switching transistor.

18. The display device of claim 17, wherein the initialization voltage generator further comprises:

a first buffering capacitor having one terminal connected to the Q node of the light emission control signal generator and another terminal connected to an initialization voltage output node; and a second buffering capacitor having one terminal connected to the Q node of the first scan signal generator and another terminal connected to the initialization voltage output node.

19. The display device of claim 1, wherein the first scan signal generator comprises:

a first transistor having a gate electrode connected to a start pulse line, a source electrode connected to a second low-level voltage line, and a drain electrode connected to a source electrode of a second transistor;

a second transistor having a gate electrode connected to a sixth clock line, a source electrode connected to the drain electrode of the first transistor, and a drain electrode connected to a Q' node of the first scan signal generator;

a third transistor having a gate electrode connected to a QB node of the first scan signal generator, a source electrode connected to a second high-level voltage line, and a drain electrode connected to the Q' node;

a fourth transistor having a gate electrode connected to a fifth clock line, a source electrode connected to the second low-level voltage line, and a drain electrode connected to the QB node;

a fifth transistor having a gate electrode connected to the start pulse line, a source electrode connected to the second high-level voltage line, and a drain electrode connected to the QB node;

a sixth transistor having a gate electrode connected to the second low-level voltage line, a source electrode connected to the Q' node, and a drain electrode connected to a Q node of the first scan signal generator;

a seventh transistor having a gate electrode connected to the Q' node, a source electrode connected to the second high-level voltage line, and a drain electrode connected to the QB node;

an eighth transistor having a gate electrode connected to the Q node, a source electrode connected to a first clock line, and a drain electrode connected to a logic output node;

a ninth transistor having a gate electrode connected to the QB node, a source electrode connected to the second high-level voltage line, and a drain electrode connected to the logic output node;

a tenth transistor having a gate electrode connected to the Q node, a source electrode connected to a first high-level voltage line, and a drain electrode connected to a first scan signal output node; and an eleventh transistor having a gate electrode connected to the QB node, a source electrode connected to a first low-level voltage line, and a drain electrode connected to the first scan signal output node.

20. The display device of claim 19, wherein the first scan signal generator further comprises:

a first bootstrap capacitor having one terminal connected to the Q node and another terminal connected to the logic output node; and a second bootstrap capacitor having one terminal connected to the QB node and another terminal connected to the second high-level voltage line.

* * * * *